United States Patent [19]

Dahl

[11] 4,079,453

[45] Mar. 14, 1978

[54] METHOD AND APPARATUS TO TEST ADDRESS FORMULATION IN AN ADVANCED COMPUTER SYSTEM

[75] Inventor: James Norman Dahl, Phoenix, Ariz.

[73] Assignee: Honeywell Information Systems Inc., Phoenix, Ariz.

[21] Appl. No.: 716,315

[22] Filed: Aug. 20, 1976

[51] Int. Cl.² ............................................. G06F 9/20
[52] U.S. Cl. ................................ 364/200; 235/312
[58] Field of Search .................. 340/172.5; 445/1; 235/153 AM; 364/200 MS, 900 MS

[56] References Cited

U.S. PATENT DOCUMENTS

| | | | |
|---|---|---|---|
| 3,704,363 | 11/1972 | Salmassy et al. | 235/153 |
| 3,778,776 | 12/1973 | Hakozaki | 340/172.5 |
| 3,786,427 | 1/1974 | Schmidt et al. | 340/172.5 |
| 3,893,084 | 7/1975 | Kotok et al. | 340/172.5 |
| 3,916,385 | 10/1975 | Parmar et al. | 340/172.5 |
| 3,938,096 | 2/1976 | Brown et al. | 340/172.5 |
| 3,955,180 | 5/1976 | Hirtlle | 340/172.5 |

*Primary Examiner*—Mark E. Nusbaum
*Attorney, Agent, or Firm*—William W. Holloway, Jr.; Ronald T. Reiling; Nicholas Prasinos

[57] ABSTRACT

In a large scale data processing system employing partitioning, paging and segmentation techniques with a descriptor enforced access to storage areas, a method and apparatus for testing address formulation is disclosed. All fundamental steps in address preparation are preserved whether a single step formulation is possible, as when the page table words are present in associative memory, or a multiple step process is required, as when the page table words must be retrieved from main memory.

5 Claims, 9 Drawing Figures

METHOD AND APPARATUS TO TEST ADDRESS FORMULATION IN AN ADVANCED COMPUTER SYSTEM

RELATED APPLICATIONS

The following applications relate generally to the data processing system to which the instant invention applies:

1. Ser. No. 516,558, filed Oct. 21, 1974, entitled "Method of Limiting Access to Privilege Memory in a Multi-Program Data Processing System".

2. Ser. No. 516,559, filed Oct. 21, 1974, entitled "Method of Accessing Privilege Memory in a Multi-Program Data Processing System".

3. Ser. No. 462,144, filed Apr. 18, 1974, entitled "Method and Means of Storing and Accessing Information in a Shared Access Multi-Programmed Data Processing System".

BACKGROUND OF THE INVENTION

This invention relates generally to data processing systems and, more specifically, to testing for and the diagnosis of, errors in address formulation in a large scale data processing system.

Present day large scale data processing systems typically include plurality of processors and permit multiple, interactive program execution by local and remote users. To accommodate such processing volume sizeable data memory must be provided for user programs and data, operating system software, and shared applications programs. Further, sophisticated software and hardware is necessary to manageably manipulate programs and data as the various activities are executed in the system processors.

In satisfying user requirements without exacting a prohibitive price for system main memory, data processing systems employ extended memories in which the primary memory of the system is supplemented by secondary or bulk storage, i.e., magnetic discs or tape drives. Thus, while any one user is actually occupying a small portion of main memory during program execution, the user appears to have a much larger "virtual memory" due to the extension of main memory provided by the secondary storage.

Storage of the information in the main memory may take the form of segments and pages wherein the user programs are divided into variable length segments and the segments may include a plurality of uniform length data pages. The use of paging permits flexibility of information storage and available memory space wherever located, with the page table provided to permit user location of the stored pages.

During the execution of a user's page segment, wherein a relative cell address is provided by the data processor, the intermediate or relative segment address provides for locating a special data word or pointer to the page being addressed, the special data word combining with the relative address to provide the absolute address of the memory cell. More specifically, base designations are provided in real storage to locate data stored therein, the base designation forming a part of the descriptor words of the shared data. Since data is moved around in real storage, the absolute addresses of the stored data are constantly changing, and descriptor words are employed to locate page tables and segments, as well as desired pages. Therefore, a segment descriptor includes the base address of the virtual and the real memory location of the segment, if the segment is non-paged, or the base address of the virtual memory segment if the segment is paged. A page table word provides the base address of a page of the corresponding segment.

Utilizing the foregoing concepts relative addresses are transmutated into absolute addresses in either a single or multiple-step process, depending upon the type of virtual address being processed as well as whether or not the appropriate page table words and/or page tables are immediately available for access by the address preparation logic.

Because of the great importance of accurately translating the relative address into an absolute address, built-in test and diagnostic apparatus are of great value in both testing the system to ensure that proper address formulation is had as well as diagnosing the cause or causes of improper address formulation should an error be found.

SUMMARY OF THE INVENTION

This application discloses three hardware implemented instructions for use in an advanced data processing system. Through the use of these instructions, effective pointer and address to test (EPAT), store test address register (STTA), and store test descriptor register (STTD), testing and diagnosing faults occurring in the virtual addresss preparation portion of an advanced computer system can readily be detected. The EPAT instruction latches the descriptor selected into special test registers each time a descriptor is called for in an address preparation. In addition, the EPAT instructions also latches the effective working space number and the working space virtual address into holding registers as that data is generated for each address preparation cycle. The real memory address is then strobed into another test register at each stage in a real memory address preparation cycle. This cycle which may be in either one or a multiple of steps depending on whether or not the page table word required for the real memory address preparation is currently in the partial page table stored in the virtual unit's associative memory. In the event that the page table word is not in the associative memory, then a sequence is invoked which requires the calling for the proper page table word from main memory into the associative memory. This process may require an additional one or more steps. In each case, a real memory address is developed at the end of each sequence, however, until the proper page table word is inserted into the associative memory the real memory addresses generated do not represent the desired addresses. The fact that that portion of the real memory address that has been generated at the end of each sequence is latched into the test register by the EPAT instruction allows the diagnosing program or engineer to examine the state of the real memory address preparation at the time a fault was generated should the real memory address preparation sequence be terminated by a fault prior to generation of the final memory address. All three registers stored during address preparation are stored in main memory via the STTA instruction.

It is, therefore, an object of this invention to provide a mechanism to assist in the testing and diagnosing of faults occurring in the address preparation cycle of a virtual address data processing system.

It is a further object of this invention to provide means for determining the actual descriptor used in address preparation.

It is a still further object of this invention to determine the data developed at each iteration in the virtual and real address memory preparation cycle.

It is still another object of this invention to store all of the diagnostic data generated into real memory.

DESCRIPTION OF THE DRAWINGS

FIG. 7 is the format for the EPAT.

DETAILED DESCRIPTION OF THE PREFERRED EMBODIMENT

Figure 1:
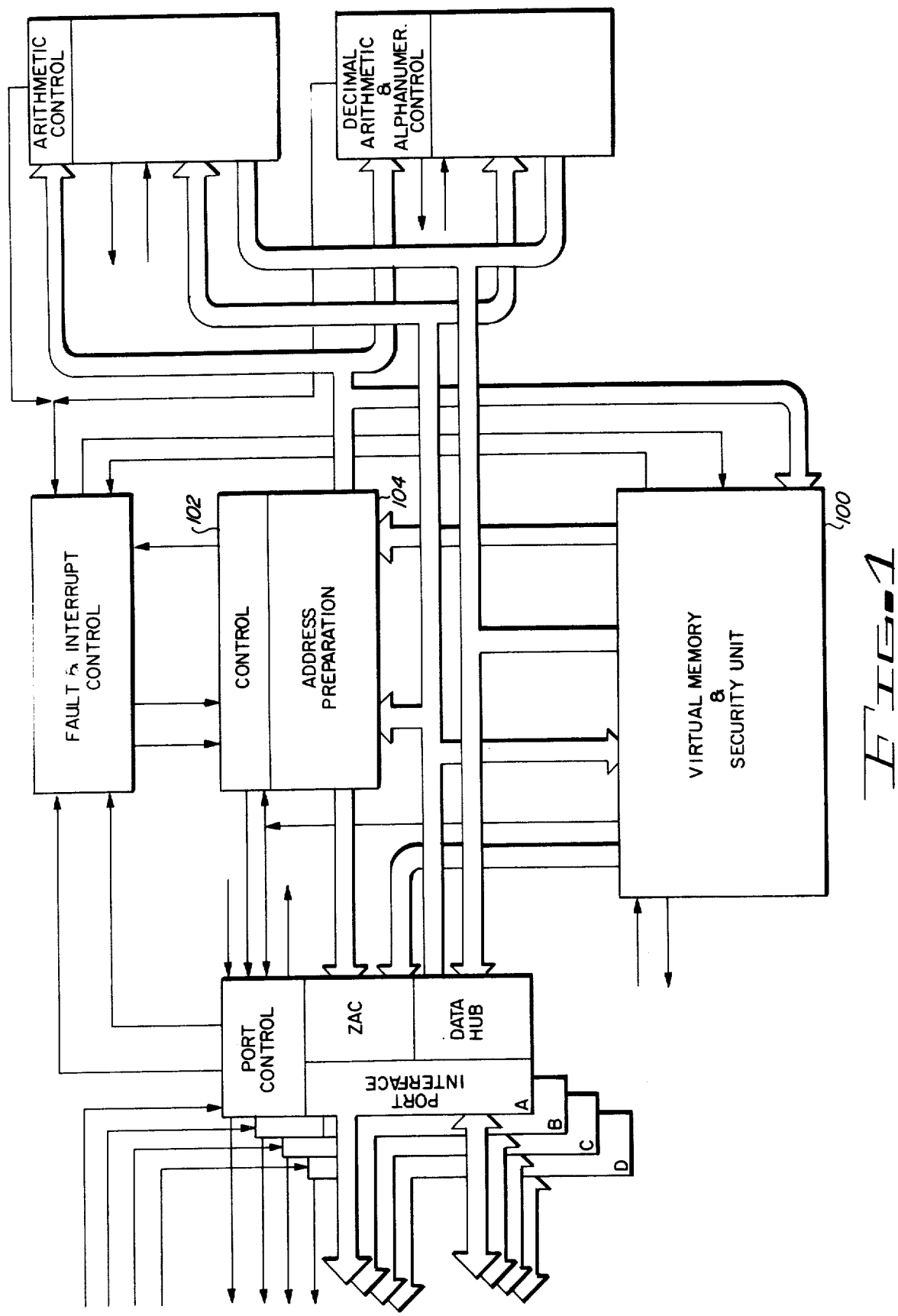
FIG. 1 is a block diagram of the advanced computer system of which this invention is a part.

FIG. 1 is a functional block diagram of the advanced data processing system in which the instant invention is utilized. With the exception of the block labeled Virtual Memory & Security Unit (VM&S) 100, this system is similar to the 6000 computer line produced by Honeywell Information Systems Inc. For information regarding the hardware and operation of the Honeywell 6000 reference may be made to publication DA48 Revision 1, entitled "Honeywell Series 6000 Summary Description", copyright 1972. The system is redundant in that control unit 102 and the address preparation unit 104 will perform all the addressing functions in the system in the absence of the VMS. Without the VM&S, however, many of the advantages of the descriptor enforced access to data are not available. When the virtual memory and security unit is operating in the system, all address preparation is done in the VM&S whether the addresses are prepared in either the virtual or absolute mode.

Figure 2:
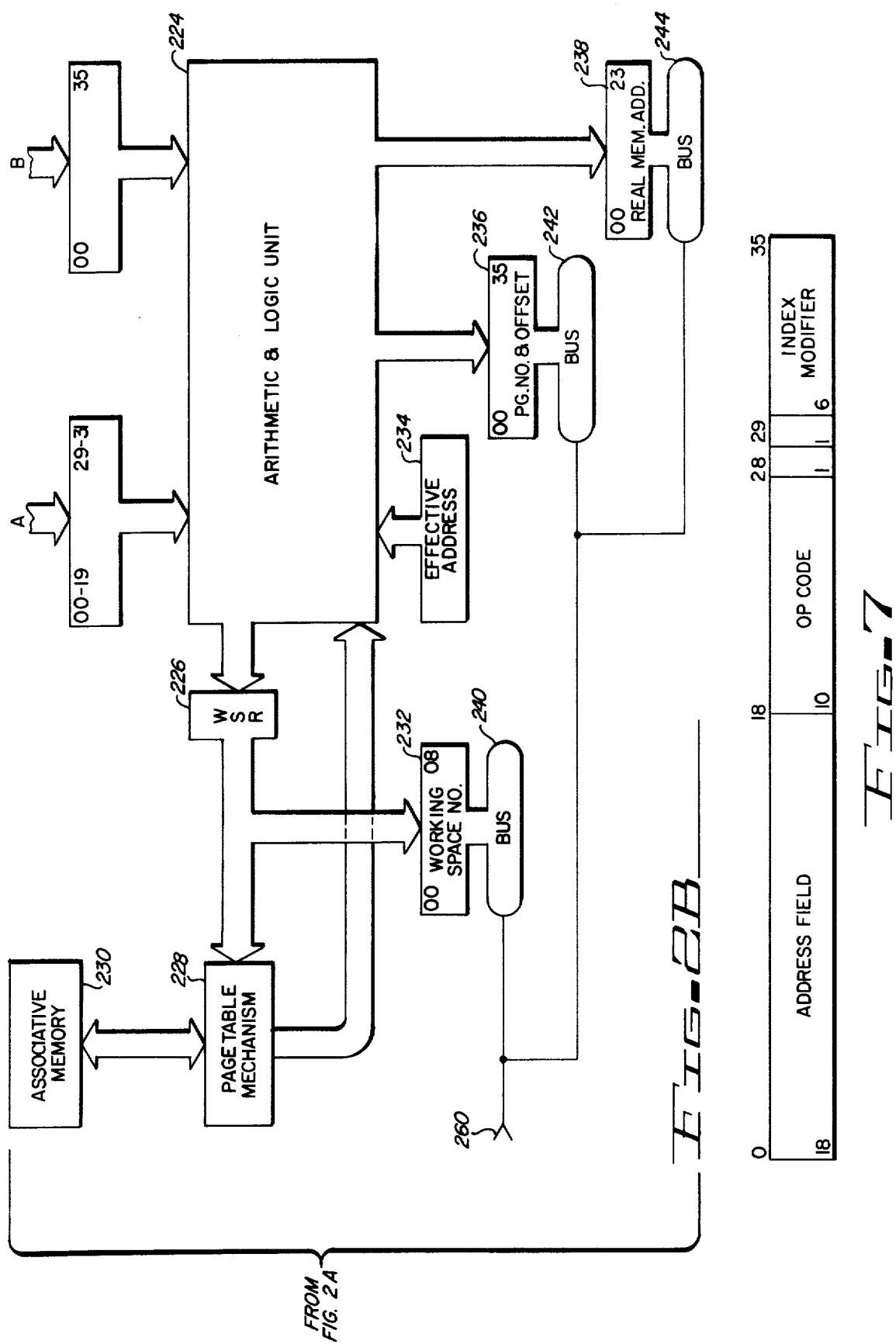
FIGS. 2A and 2B are a schematic/block diagram of the apparatus used to implement the invention.

FIGS. 2A and 2B are logic diagrams of the hardware manipulated by the EPAT instruction. Also included in FIG. 2 is the implementation of the STTD and STTA instructions which place the information stored by the EPAT instruction into memory. Shown in FIG. 7 is the format of the EPAT instruction. Bits 0 through 17 represent the address field of the instruction and, depending upon the state index modification bits, 30 through 35, will form the effective address of the instruction shown at 234 of FIG. 2A. The OP code occupies bit positions 18 through 27 and, for the EPAT instruction, is equal to 412$_8$. When the OP code is transmitted to the control unit 102 of FIG. 1, the control unit identifies the operation to be performed and provides the necessary data to the hardware for carrying out the function. Bit 28 is an interrupt inhibit bit which will prohibit an interrupt from being generated during the course of the instruction whenever it is set to a one. This feature allows completion of the desired function even though the system hierarchy would normally prevent complete execution of the instruction. Bit 29 is an operand descriptor modifier and if equal to a zero, means that the descriptor in the instruction segment registers 204 and 206 of FIG. 2A, will be selected for use in the address preparation sequence. When bit 29 is set to a one, the operand descriptor register banks 200 and 202 of FIG. 2A are selected. Since there are eight operand descriptor registers in each of the two descriptor register banks 200 and 202 in the virtual unit, it is necessary to determine which one of the eight is to be used for address preparation. To accomplish this end, whenever bit 29 is set to a one, the first three bits of the address field of the instruction 246, 248, and 250 of FIG. 2A, select which one of the eight operand descriptor registers is to be used. If the first three bits of the instruction address fields are zeroes, then ODR-0 of 200 and 202 is selected, if the bits are 001 then ODR-1 is selected, etc.

Figure 3:
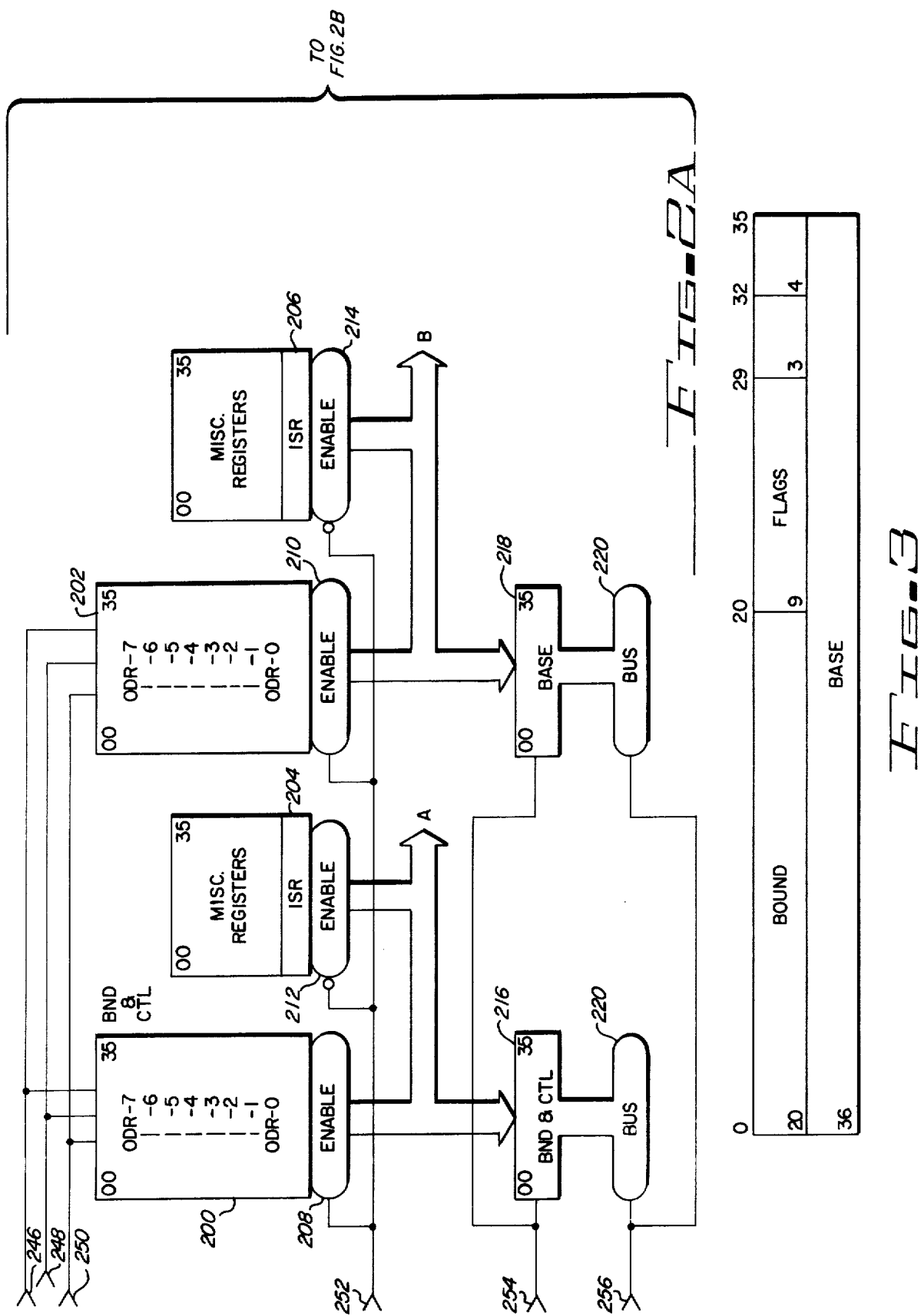
FIG. 3 is an illustration of one of the standard descriptor formats used in address preparation.
Figure 4:
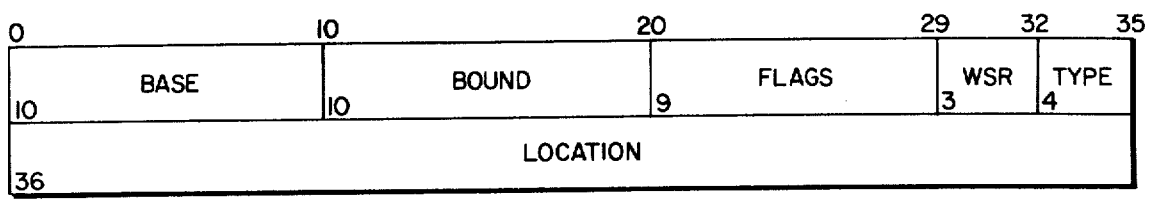
FIG. 4 is an illustration of one of the super descriptor formats used in address preparation.

FIGS. 3 and 4 show the format for the standard descriptor and super descriptor, respectively. Bits 0 through 19 of the first 36 bit word of the standard descriptor represents the bound value of the segment in relation to the base, which is the second 36 bit word. The bound value is the upper limit for references in the segment described by the descriptor, starting at the base location. Bits 20 through 28 are flag bits which indicate, to the hardware, the attributes of the segment defined by the descriptor. The following table indicates those attributes of the segment which are defined when the respective flag bit is turned on, i.e., a logical one.

FLAGS

| Bit | Attribute Allowed |
|---|---|
| 20 | Read Allowed |
| 21 | Write Allowed |
| 22 | Descriptor Save Allowed |
| 23 | Cache Buffering Allowed |
| 24 | Reserved for Software Control |
| 25 | Execution Allowed |
| 26 | Privilege Mode Allowed |
| 27 | Bound is Defined |
| 28 | References are Allowed |

When any of the bits is a zero, it means that the applicable attribute is not allowed. Bits 29 through 31 define the working space register, more of which will be described later, and bits 32 through 35, define the various types of descriptors that are used in the system. The standard and super descriptor are not the only descriptor types that are defined in the system but are given merely to illustrate the basic system configuration.

The super descriptor of FIG. 4 is used for defining extremely large segments in the virtual memory. Bits 0 through 9 are interpreted as the base value for the segment and the system automatically right fills the base with 26 zeroes in order to form a 36 bit base word. The bound field, bits 10 through 19, is similarly interpreted, except that it is one filled to make it a 36 bit word. Bits 20 through 28 of the super descriptor are the same flag bits and have the same meaning as that described in the table above for the standard descriptor. Bits 29–31 define the working space register and bits 32 through 35 define the type descriptor in the super descriptor as did those bits in the standard descriptor. The 36 bit location word of the super descriptor is an offset from the module $2^{26}$ base. As is the case in the standard descriptor, the offset defined by the location word must be less than the extended bound value.

Once the EPAT instruction has been read into the control unit 102 and transferred to the virtual unit 100, bit 29 (input 252) of FIG. 2A enables either the instruction segment registers 204 and 206 or operand descriptor registers 200 and 202. Assuming that a standard descriptor is to be used in the address preparation cycle, the first 36 bit word containing the bound value, flags working space register number, and descriptor type is loaded into holding register 216 by hold signal 254. At the same time the second descriptor word containing the 36 bit base is loaded onto register 218 by hold signal 254. Registers 216 and 218 hold the two descriptor words until the next EPAT instruction causes another hold signal to be generated. The data is thus available for storage in main memory by the STT instuction, 256, which will put the two descriptor words on busses 220 and 222, respectively for transfer to main memory. It should be noted that this data may be stored at any time prior to the next EPAT instruction, as it will not change during any other address preparation cycles. Simultaneously, with the clocking of the descriptor words into registers 216 and 218, the pertinent portion of the descriptor words are transferred, as shown in FIG. 2B to an arithmetic and logic unit to be used in the actual address compilation.

Figure 5:
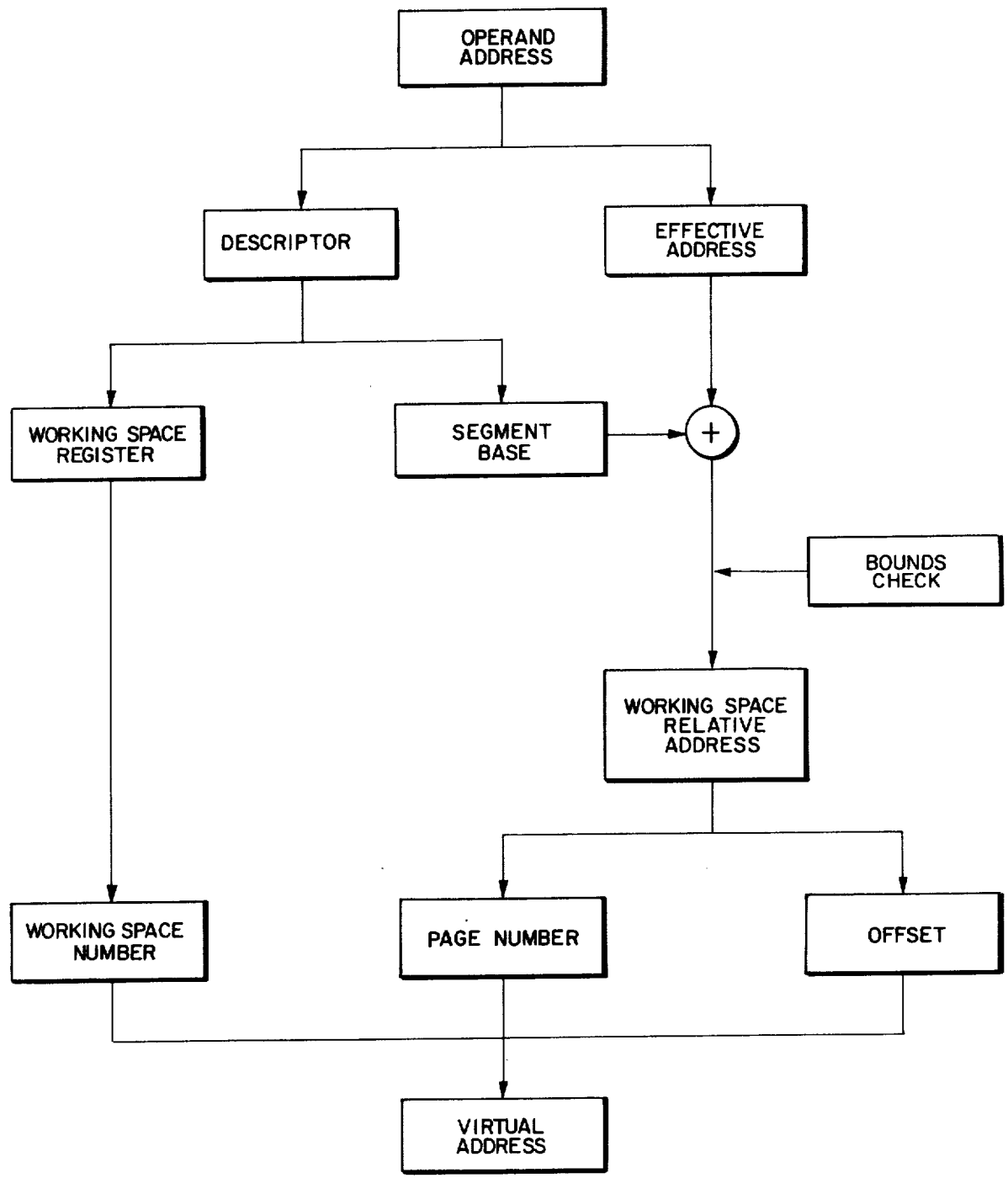
FIGS. 5 and 5A are a block diagram of the address preparation sequence used in the virtual memory unit, of which the instant invention is a part.
Figures 5A, 6:
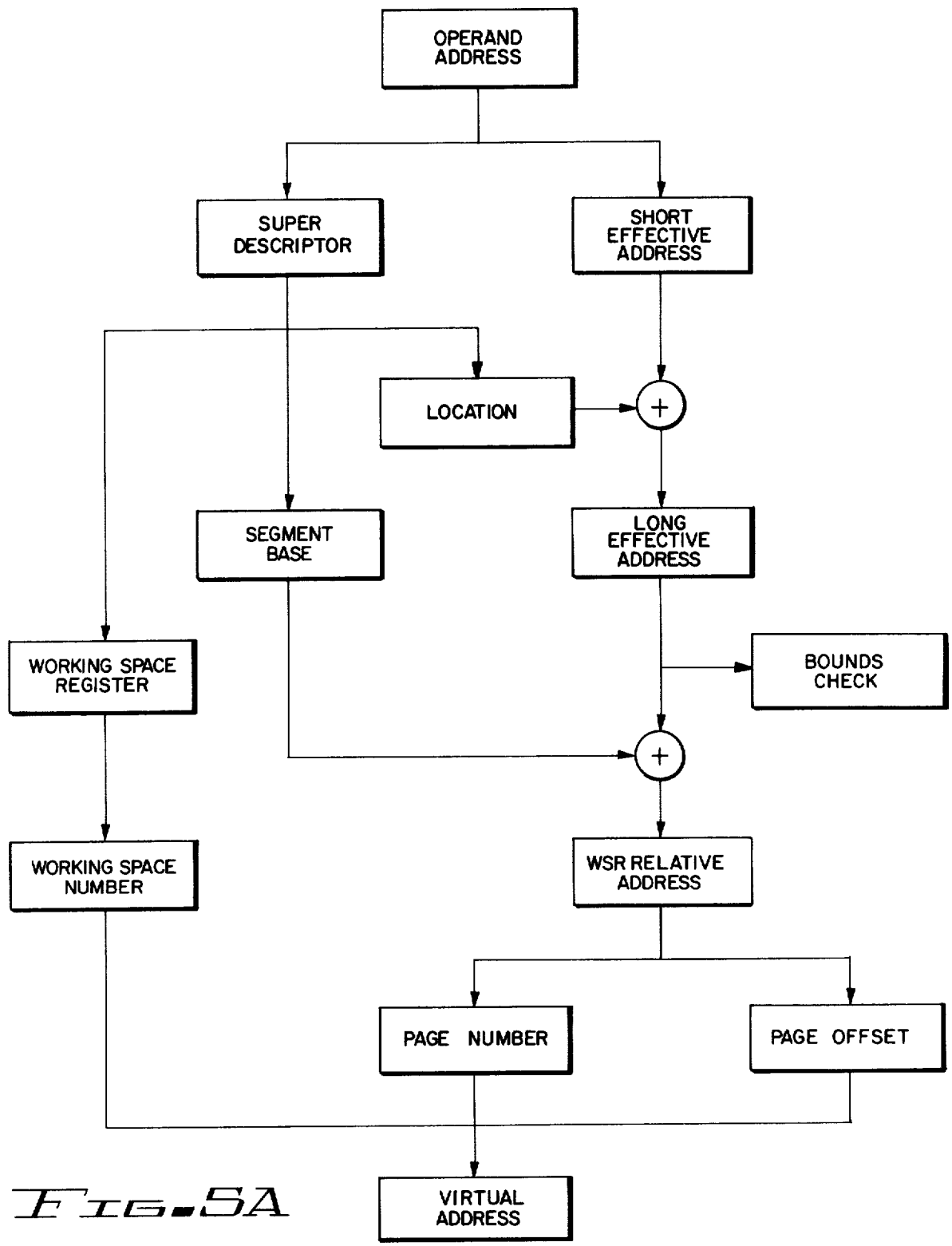
FIG. 6 is an illustration of the data format for the 47 bit virtual address.

FIGS. 5 and 5A are block diagram representations of the address preparation sequence using the standard descriptor and super descriptor, respectively. Although the super descriptor and standard descriptor follow somewhat different paths in arriving at the virtual address, the format for the virtual address is identical for either descriptor. For the standard descriptor the operand address selects, via bit 29, a descriptor from either the instruction segment register or one of the eight operand descriptor registers and also supplies the arithmetic and logic unit 224 with an effective address. The second descriptor word supplies the segment base and the effective address is added thereto to provide a working space relative address. At this time a bounds check is made to ensure that the working space relative address is less than the sum of the segment base plus the bounds value found in bits 0 through 19 of the first descriptor word. Concurrent with these calculations, bits 29 through 31 of the first descriptor word select a working space register and thereby a working space register number which, in conjunction with the working space relative address, provides a page number and offset. These three components, the working space number, page number, and offset are then combined to form the 47 bit virtual address shown in FIG. 6. The four least significant bits of the virtual address are bit relative, i.e., they point to a particular bit in the 36 bit word being referenced, and are not generally available for later use. The address preparation sequence for the super descriptor shown in FIG. 5A is similar to the standard descriptor, except that an intermediate effective address is generated via the page table mechanism. This intermediate step is required because of the extremely large segment defined by a super descriptor.

The hardware implementation of the address preparation sequence shown in flow chart form in FIGS. 5 and 5A, is diagramed in FIG. 2B. The pertinent portion of the descriptor, i.e., the bounds value in bits 0 through 19 and the working space register number of bits 29 through 31 of the first descriptor word, as well as the base value (location value) of the second 36 bit descriptor word. Bits 0 through 17 of the instruction operand 234 is an input into the ALU, although it must be remembered that depending upon the index modifier bits 30 through 35 of the operand instruction this effective address may be modified prior to its use in the address preparation sequence. Bits 29 through 31 of the first descriptor word then select one of eight working space registers 226 which define the working space number to which the descriptor has been assigned. The working space number is then used as an index into the page table mechanism 228 and its associative memory 230. At the same time the working space number is made accessible to the working space number buffer register 232. Buffer register 232 is accessible only through use of the STTA instruction 260 which enables bus 240 to store the working space number in main memory. In the event the working space number does not index data currently stored in the page table mechanism or its associative memory retrival of the appropriate data from mass storage is required. Since there is a multiplicity of references in the page table mechanism and the associative memory, it is possible that a plurality of separate access' to mass storage may be required. Because of this possibility, the real memory address is not latched into the buffer registers 232, 236, and 238. By use of this non-latching technique the STTA instruction 260 will store either the final addresses prepared after the necessary iterations and retrievals are made or, in the case of an interrupt, and the interrupt bit of the instruction operand has not been set to a one, then the state of the virtual and real memory addresses as of the time the fault occurred will be accessible via the STTA instruction operating on busses 240, 242, and 244.

While the principles of the invention have now been made clear in an illustrative embodiment, there will be many modifications of the structure, arrangement, proportions, elements, materials, and components that are obvious to those skilled in the art without departing from those principles. The appended claims are therefore intended to cover and embrace any such modifications within the limits of the true spirit and scope of the invention.

What is claimed is:

1. In a large scale data processing system including a segmented main memory with restricted access enforced by descriptor referenced entry, a hardware implemented instruction for testing address formulation, said hardware comprising:
   (a) first register means for storing a plurality of descriptors;
   (b) second register means for storing one descriptor;
   (c) first selection means connected to the first and the second register means, responsive to a selection bit of the instruction, for selecting the first register means when the selection bit is in a first state and for selecting the second register means when the selection bit is in a second state;
   (d) second selection means responsive to a plurality of bits in an address field portion of the instruction for selecting a one of the plurality of descriptors in the first register means when the selection bit of the instruction is in the first state and selecting the descriptor in the second register means when the selection bit is in the second state;
   (e) first buffer means connected to said first selection means for latching the data contained in the descriptor selected;
   (f) second buffer means for latching a working space number selected by a first plurality of bits of the descriptor;
   (g) third buffer means for latching a page number and offset generated by a second plurality of descriptor bits and an address relative to the address field of the instruction;
   (h) fourth buffer means for holding a real address derived, in part, from the working space number, page number, and offset;

(i) first bus means connected to the first buffer means and responsive to a first store instruction for storing the contents of the first buffer in main memory;

(j) second bus means connected to the second, third and fourth buffer means for storing the contents of those buffers into main memory in response to a second store instruction.

2. The hardware implemented instruction first testing address formulation as recited in claim 1, wherein said first register means further comprises 16–36 bit registers for storing eight 2-word, 36-bit descriptors.

3. The hardware implemented instruction for testing address formulation as recited in claim 1, wherein said second selection means is responsive to the first, second, and third bits of the address field portion of the instruction.

4. The hardware implemented instruction for testing address formulation as recited in claim 1, wherein: the working space number is selected by three bits in a first 36-word of the descriptor.

5. In a large scale data processing system including a segmented main memory with restricted access enforced by descriptor reference entry, the method of testing address formulation comprising:

(a) placing the descriptor selected by a plurality of bits in an instruction in a first register whose contents may be stored in main memory;

(b) generating a virtual address from the data contained in said descriptor, (c) placing the virtual memory address generated by the data contained in the descriptor and the effect of address specified by the instruction, in a second register whose contents may be placed in main memory, (d) placing the real memory address derived, in part, from the virtual memory address in a third register whose contents may be placed in main memory;

(e) placing the data so stored in the registers in main memory;

(f) comparing the addresses so stored in main memory with known, correct addresses and determining if an error has occurred and, if so in what bit positions the errors occur.

* * * * *